United States Patent [19]

Vaughn

[11] 4,150,579

[45] Apr. 24, 1979

[54] HYDRAULIC TORQUER DEVICE FOR FLOATED INERTIAL PLATFORM

[75] Inventor: Thomas R. Vaughn, San Pedro, Calif.

[73] Assignee: Northrop Corporation, Los Angeles, Calif.

[21] Appl. No.: 786,572

[22] Filed: Apr. 11, 1977

[51] Int. Cl.² .............................................. G01C 19/02
[52] U.S. Cl. ..................................... 74/5 R; 137/875; 251/129; 74/5.6 D; 74/5.43
[58] Field of Search ................ 74/5 R, 5.4, 5.41, 5.43, 74/5.5, 5.6 B, 5.6 D; 251/129, 140; 137/875, 625.44; 200/277

[56] References Cited

U.S. PATENT DOCUMENTS

| | | | |
|---|---|---|---|
| 1,866,706 | 7/1932 | Henderson | 74/5.5 |
| 3,385,309 | 5/1968 | Bains | 137/875 |
| 3,643,049 | 2/1972 | LuConic | 200/277 |
| 3,696,683 | 10/1972 | Jensen | 74/89.18 |
| 4,019,392 | 4/1977 | Zamfirescu | 74/5 R |

Primary Examiner—Samuel Scott
Assistant Examiner—G. A. Anderson
Attorney, Agent, or Firm—Edward A. Sokolski

[57] ABSTRACT

A fluid floated inertial platform is inertially stabilized by means of a plurality of hydraulic torquers which operate in response to electrical stabilization signals which may be generated in response to gyro pickoffs on stabilizing gyros for each of the three stabilization axes. Each of these hydraulic torquer devices comprises a deflector member, which may be in the form of a section of a cylinder, this deflector member being supported on a base member mounted in the surface of the platform. The deflector is supported on the base member by means of flexible strips or tapes which permit rotatable motion of the deflector in response to torquing signals. Such rotatable torquing of the deflector is provided by means of an armature mounted on the deflector which operates in conjunction with an electrical torquer on the base member which receives electrical torquing signals from the stabilization system. One or more fluid jets are fed from one or more nozzles at the surface of the platform against the body of the deflector. With the deflector in its "neutral" position, each jet is split into a pair of equal force jets which impinge against the casing in which the platform is supported, equally but oppositely, such as to effectively cancel each other out. When a deflector is rotated one way or the other from neutral in response to an electrical torquing signal, the magnitudes of the paired jets become unequal in accordance with the magnitude and direction of this rotation, thereby providing a torque on the platform in response to the electrical torquing signal.

9 Claims, 8 Drawing Figures

HYDRAULIC TORQUER DEVICE FOR FLOATED INERTIAL PLATFORM

The Government has rights in this invention pursuant to United States Air Force Contract No. F04704-75-C-0015.

This invention relates to torquers for floated inertial platforms, and more particularly to such a torquer which employs hydraulic thrust in response to an electrical torquing signal.

In U.S. Pat. No. 3,439,546, issued Apr. 22, 1969, and assigned to Northrop Corporation, the assignee of the present application, a floated inertial platform is described which employs a ball shaped platform which is supported on a spherical fluid bearing formed between the platform and a spherical support casing. This prior art floated inertial platform is inertially stabilized by means of electrical torquing units mounted along the surfaces of the platform which provide three-axis eddy current torquing in response to gyro pickoffs on the stabilizing gyros for each of the three stabilization axes. This type of eddy current torquing has obtained wide acceptance in the field. However, the use of hydraulic thrusters has distinct advantages insofar as its efficiency, producability and economy of construction, particularly in situations where the hydraulic fluid and pump are already available as in the case of a liquid floated inertial platform.

Fluid thrusters have been well known in the art for a number of years. Such a device is described in U.S. Pat. No. 1,866,706 to Henderson. The device of the Henderson patent employs a pneumatic jet which is split into two jets by a wedge shaped splitter member. The splitter member is rotatably driven in response to a stabilizing signal, thereby unequalizing the jets in response to this signal and providing the torquing needed for stabilization of the gyro. In a thruster for a ball-shaped floated inertial platform, a version of this wedge type splitter has been developed utilizing hydraulic jets. In this device, however, the splitter is maintained stationary and the nozzle from which the fluid jet is emitted is rotated in response to the stabilization signal.

This prior art device has several shortcomings. First, the device of the prior art employs rotor laminar flow seals and hydrostatic suspension bearings, which have extremely close clearances exposed to the full pressure drop and therefore tend to trap dirt particles. Further, in the device of the prior art the high velocity discharge jet is rotated through a large angle relative to the splitter, which makes for relatively low efficiency (typically below 60%).

The device of the present invention overcomes the aforementioned shortcomings of the prior art by avoiding the need for laminar flow seals and hydrostatic suspension bearings. Further, the device of the present invention converts pressure energy directly into velocity at the appropriate exit angle, thus eliminating losses in the splitter, thereby enabling a substantial improvement in efficiency over the device of the prior art. The device of the present invention also affords increased reserve thrust. Throughout the normal stroke, combined discharge nozzle area and total thruster flow are constant. As the left nozzle area decreases, that on the right increases. During vehicle boost acceleration, however, thrust requirements are greatest. The device of the present invention has the capability to overstroke, i.e., it can increase the discharge area beyond the normal constant value. Although the increased area in effect robs flow from the other valve pairs, the net effect is to apply the torque at the axis where it is most needed. In view of the increased efficiency of the device of the present invention, the hydraulic power supplied may be reduced without jeopardizing operating margins. It is also to be noted that the use of a rolling deflector eliminates sliding surface wear present in prior art devices. The device of the present invention further has the advantage of being substantially easier and more economical to produce than the prior art thruster, in that critical alignment of the pieces required in the prior art device is obviated in the present invention.

It is therefore an object of this invention to provide a torquer device employing an hydraulic thruster which has improved efficiency over the prior art.

It is a further object of this invention to provide a torquer device employing an hydraulic thruster which is of simpler and more economical construction than prior art devices.

Other objects of the invention will become apparent as the description proceeds in connection with the accompanying drawings, of which:

Briefly described, the invention is as follows: A ball shaped inertial platform which is supported on a spherical fluid bearing formed between the platform and a spherical support casing has a plurality of torquing units installed along the surface thereof for stabilizing the platform in response to electrical stabilization signals. Each of the torquing units includes a thrust deflector which may be in the form of a section of a cylinder having an arcuate surface which is mounted for rolling motion on a base member by means of elastic strips or tapes. The base member is mounted in the surface of the platform. Hydraulic jets are provided through the base member from the surface of the platform against the surface of the deflector through nozzles which emit pressurized fluid. An electrical torquer is provided in the base member which operates in conjunction with an armature mounted on the deflector. The torquer receives electrical signals for stabilizing the platform from gyroscopic pickoffs or the like, these signals operating in conjunction with the armature to rotate the deflector in response to the signals. With the deflector in its neutral position, i.e. in the absence of any torquing signals, the jet from the nozzle is split by the deflector into two equal and oppositely acting jets resulting in zero net torquing force on the platform. With a torquing signal commanding torquing in a first direction, the deflector is rotated in such a manner as to provide a splitting of the input jet into two unequal oppositely acting jets, so as to provide a net torque in this first direction. Conversely, a torquing signal which commands a rotation of the deflector from its neutral position in an opposite direction to that first mentioned, will result in a net torque in an opposite direction. In a preferred embodiment, a pair of hydraulic nozzles are employed, each being utilized to provide an hydraulic jet at a different position along the length of the deflector. Also in this preferred embodiment, end flow control fences are provided around the deflector in the regions of the nozzles to minimize axial dispersion of the jets.

Figure 1:
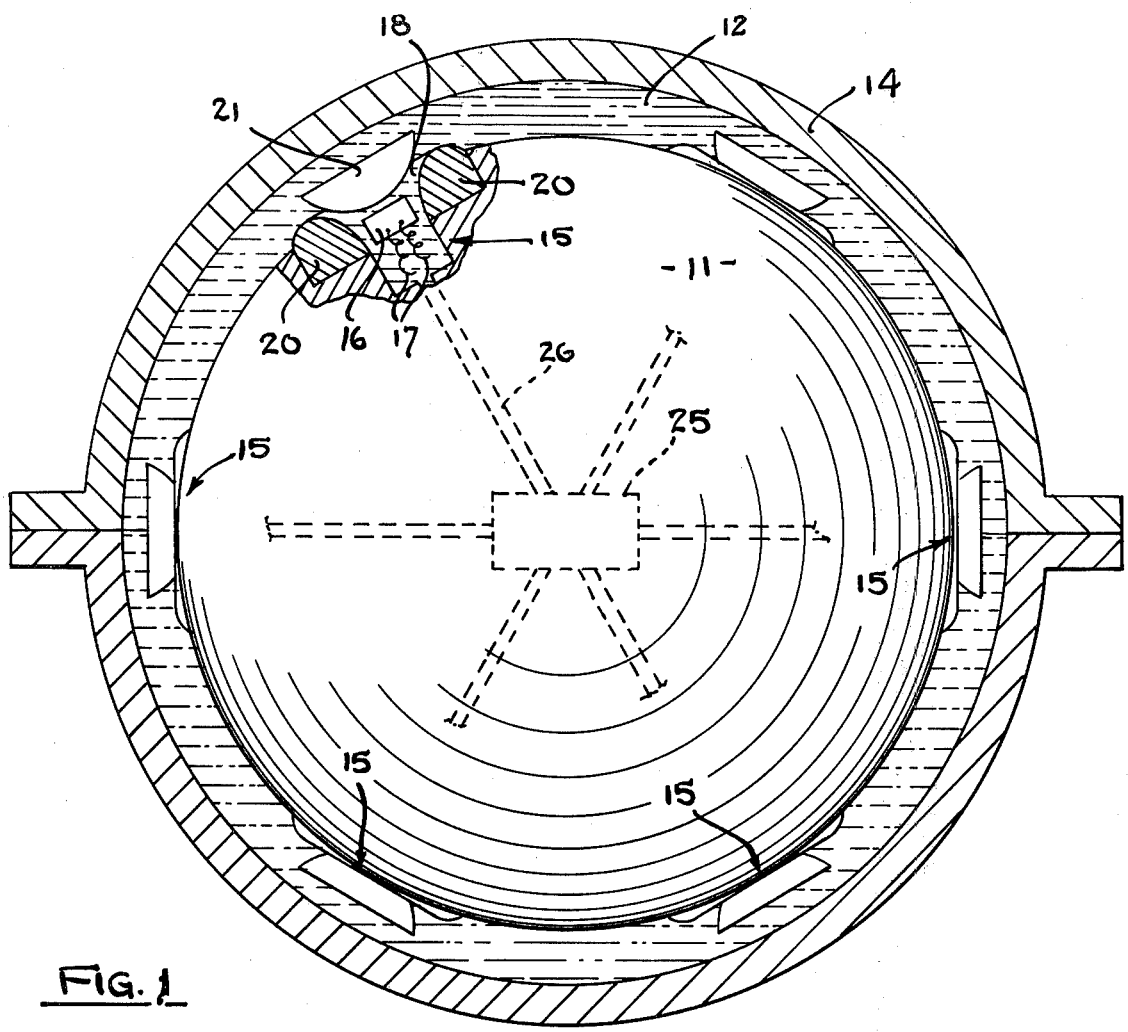
FIG. 1 is a schematic drawing illustrating the device of the invention installed in a floated inertial platform.

Referring now to FIG. 1, the operation of the device of the invention in a typical floated inertial platform is illustrated. Inertial platform 11 is a ball shaped member which is floated on a flotation fluid 12 within spherical support casing 14. The platform, casing and flotation fluid may be of the general type described in the aforementioned U.S. Pat. No. 3,439,546. This type of platform may be utilized in vehicle guidance and control systems to provide a stable reference platform as the vehicle is maneuvered, and may for example provide a support for acceleration sensitive instruments isolated from local vehicle maneuvers, thereby enabling such instruments to accurately measure the travel of the vehicle from an initial reference point. Such a stabilized platform also can enable the generation of signals indicating the attitude of a vehicle which are useful in the control thereof.

Mounted around the surface of platform 11 are a plurality of paired torquer units 15, which are used to maintain platform 11 inertially stabilized in response to appropriate control signals. There are typically three pairs of such torquing units, each pair being employed for stabilizing the platform about one of three mutually orthogonal axes. Each of the torquer units includes an electrical torquer 16 which receives appropriate control signals on wires 17, these signals being generated in response to gyro pickoffs on the stabilizing gyros for each of the three stabilization axes. Torquer 16 is supported in base member 20, to which deflector 21 is attached by means of flexible strips or tapes 18. Deflectors 21 are thus attached to their associated bases 20, and are free to roll in response to deflection forces within the limits established by tapes 18. A fluid pump 25 is mounted in platform 11 and provides jets of fluid through lines 26 to nozzles 30, which are provided for each of the torquer units.

Figure 2A:
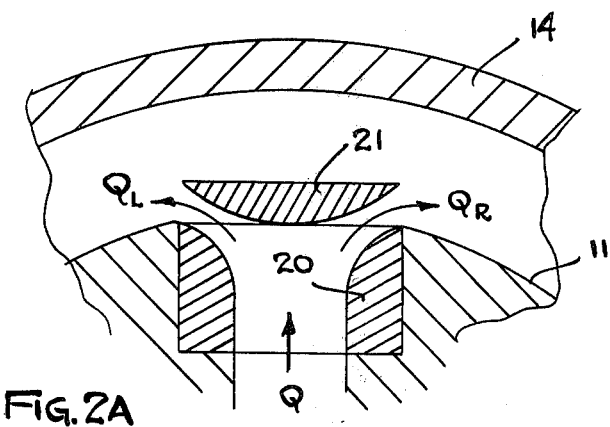
FIGS. 2A–2C are a series of schematic illustrations illustrating the operation of the thruster unit of the invention.
Figure 2B:
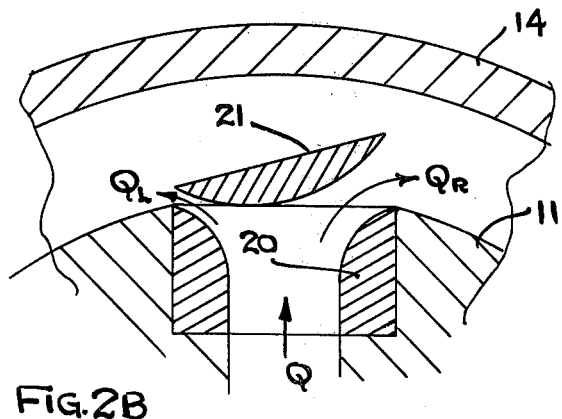
Figure 2C:
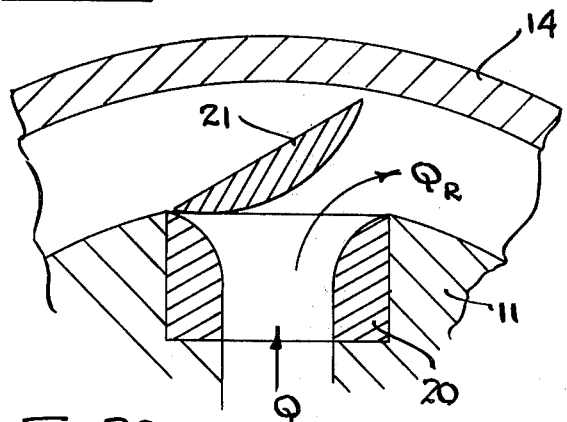

Referring now to FIGS. 2A–2C, the operation of the deflectors of the invention is schematically illustrated. FIG. 2A illustrates the deflector in a state of equilibrium, i.e. with zero torquing input. Under such circumstances, the deflector 21 remains at its central position and the fluid jet input "Q" is divided into equal left and right components, "$Q_l$" and "$Q_r$," respectively. The thrusts provided by "$Q_l$" and "$Q_r$" cancel each other out, providing zero net thrust on the stable platform.

Referring now to FIG. 2B, the operation of the device is illustrated with a torquing input of medium amplitude to effect a counter-clockwise displacement of the platform. Thus, as can be seen, deflector member 21 is rotated in response to the torquing signal to the left, thereby making for a greater amplitude jet "$Q_r$" than "$Q_l$". This results in a net thrust which causes the desired displacement of platform 11 in accordance with the control signal.

Finally, FIG. 2C illustrates a situation with a high amplitude torquing signal input which rotates thruster 21 to its extreme left limit position. In which case, "$Q_r$" has a high amplitude, and "$Q_l$" is zero, thereby providing a high amplitude couterclockwise torquing signal to platform 11.

It is to be noted that the thruster operates in a closed loop servo system such that the signal generated by the gyro pickoff returns to zero when the platform reaches its stabilized condition. With a tight servo loop of course, the platform departs but slightly from its stabilized condition, the servo loop maintaining essential stabilization at all times. It can be seen that torquing in the opposite direction can be effected in equal manner in response to torquing signals which rotate deflector 21 to the right, thereby making jet "$Q_l$" greater than jet "$Q_r$".

Figure 3:
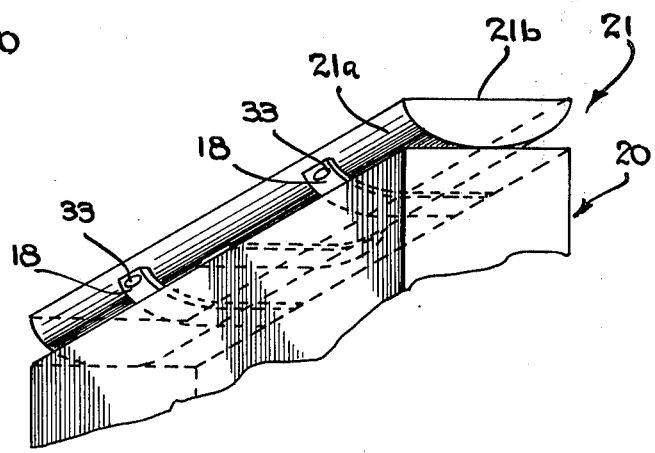
FIG. 3 is a perspective view illustrating a preferred embodiment of the thruster of the invention.

Referring now to FIG. 3, the general structural features of a preferred embodiment of the deflector of the invention shown supported on a base unit is illustrated. Deflector 21 is in the form of a section of a cylinder having a spherical surface 21a and a flat surface 21b. Deflector 21 may be fabricated of a suitable metal or plastic material. The deflector 21 is attached to rectangular base member 20 which is imbedded in the surface of platform 11 by means of flexible bands or strips 18. Bands 18 are fixedly attached at one end thereof to deflector 21, and at the other end thereof to base member 20 by means of stakes or pins 33. The bands are fabricated of a flexible material such as beryllium copper which will permit rolling motion of the deflector within limits of about 30° of rotation to either side of the central neutral position.

Figure 4:
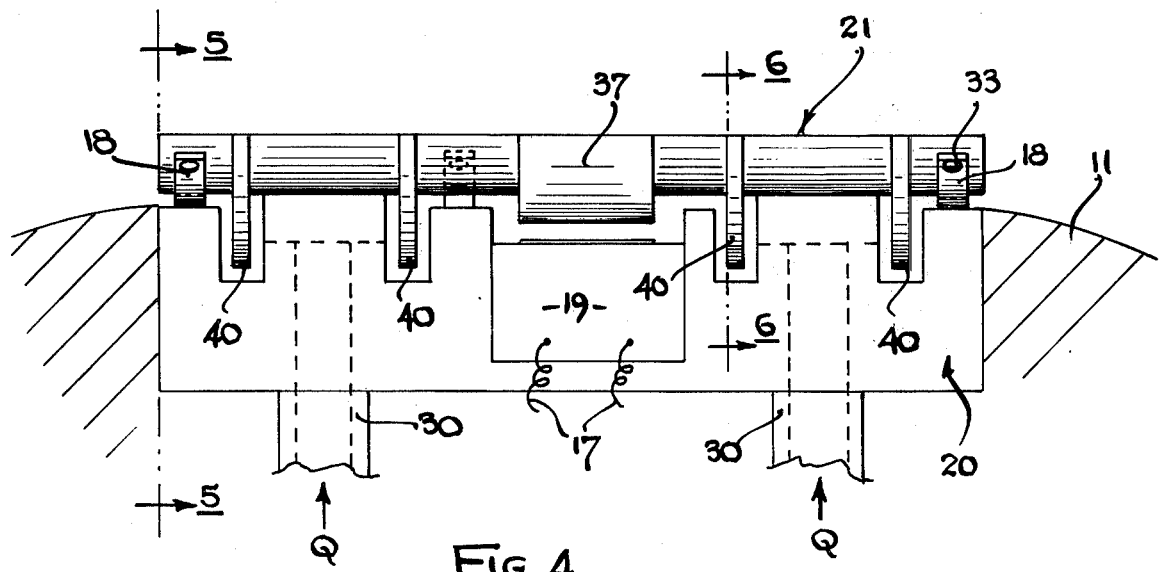
FIG. 4 is an elevational view illustrating a preferred embodiment of the invention installed in a floated inertial platform.
Figure 5:
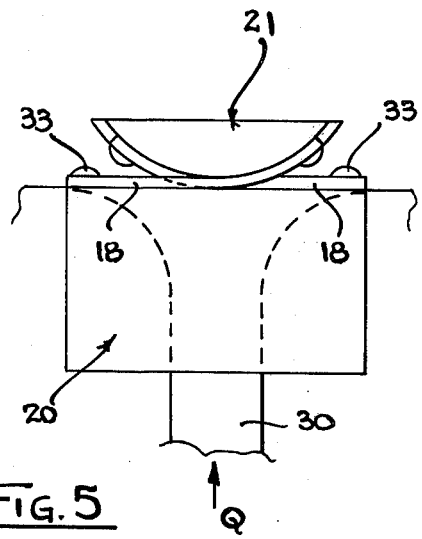
FIG. 5 is an end view of the embodiment illustrated in FIG. 4.
Figure 6:
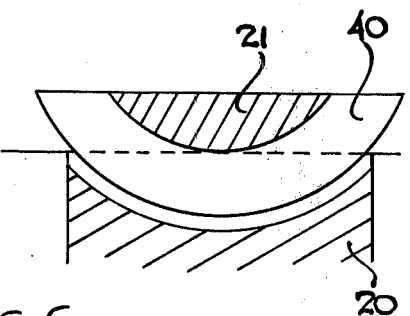
FIG. 6 is a cross-sectional view taken along the plane indicated by 6—6 in FIG. 4.

Referring now to FIGS. 4–6, a preferred embodiment of the invention installed in a stable platform is illustrated. Deflector 21, which has the same general form as described in connection with FIG. 3, is supported above and attached to base member 20 by means of flexible tapes 18, the tapes being pinned at one end thereof to the deflector and at the other end thereof to the base by means of pin members 33. Base member 20 is mounted in platform 11 and fixedly attached thereto by suitable means such as machine screws or cement. Electrical torquer 19 is fixedly mounted in base member 20 and receives torquing signals from the stabilizing signal source on wires 17. Integrally formed with deflector 21 is armature member 37. Armature 37 is fabricated of a suitable magnetic material for reaction with electrical torquer 19.

Nozzles 30, which are suitably flared at their outlets as shown in FIG. 5, extend through base member 20 and convey the fluid jets from pump 25 (see FIG. 1) to deflector 21. Fixedly attached to and wrapped around deflector 21 on either side of nozzles 30 are end fence members 40 which minimize the axial dispersion of the jet and effectively confine the jets to the desired work areas. It is to be noted that a pair of jet nozzles are employed in the preferred embodiment to afford high thrust capability.

While the invention has been described and illustrated in detail, it is to be clearly understood that this is intended by way of illustration and example only, and is not to be taken by way of limitation, the spirit and scope of this invention being limited only by the terms of the following claims.

I claim:

1. In an inertial platform supported in a casing and having a source of pressurized fluid, means for generating electrical inertial stabilization signals, a torquer system including a plurality of torquer units for torquing said platform in response to said stabilization signals to maintain the platform inertially stabilized, each of said torquer units comprising:

a base member mounted in the surface of the platform, a thrust deflector in the form of a generally cylindrical section having an arcuate surface, means for elastically supporting said deflector on said base member for limited reciprocal rolling motion thereon, nozzle means for conveying a fluid jet from said source of pressurized fluid through said base member and against the arcuate surface of said deflector, said deflector splitting said fluid jet into a pair of jets which cause equal and opposite torsional reactions between the platform and the casing with the deflector in a predetermined neutral position, an electrical torquer mounted in said base member adjacent to said deflector, at least a portion of said electrical stabilization signals being fed to said electrical torquer, and a torquer armature on said deflector positioned opposite said electrical torquer for interaction therewith, whereby said electrical torquer rotatably drives said deflector from said predetermined neutral position through a limited arc in response to the electrical inertial stabilization signals to increase the amplitude of one of said jets and decrease the amplitude of the other of said jets, thereby causing said paired jets to produce opposite but unequal reactions between the platform and the casing, such as to torque the platform to the inertially stabilized position.

2. The device of claim 1 wherein said means for elastically supporting the deflector comprises a plurality of elastic tapes attached at one end to said deflector and the other end to said base member to permit pivotal motion of said deflector in opposite directions.

3. The device of claim 1 wherein said platform is in the form of a ball, said casing being spherical in form, and a liquid bearing between the ball and the casing for supporting said platform.

4. The device of claim 3 wherein said source of fluid pressure is a pump having fluid therein mounted in said platform, a line running from said pump to each of said torquer units and a nozzle in the base member of each of said torquer units for directing said jets against said deflectors.

5. The device of claim 4 wherein there are a pair of lines and nozzles running from said pump to each of said deflectors.

6. In a ball shaped inertial platform supported in a spherical casing on a fluid bearing and having a source of pressurized fluid, means for generating inertial stabilization signals, a torquer system including a plurality of torquer units for torquing said platform in response to said stabilization signals to maintain the platform inertially stabilized, each of said torquer units comprising:

a base member mounted in the surface of the platform, a thrust deflector in the form of a body having a convex arcuate surface portion, means for elastically supporting said deflector on said base member for limited reciprocal rolling motion thereon, nozzle means for conveying a fluid jet from said source of pressurized fluid against the arcuate surface portion of said deflector, said deflector splitting said fluid jet into a pair of jets which cause equal and opposite torsional reactions between the platform and the casing with the deflector in a predetermined neutral position, and means mounted in said base member for rotatably driving the deflector from said predetermined neutral position through a limited arc in response to said stabilization signals to increase the amplitude of one of said jets and decrease the amplitude of the other of said jets, thereby causing said paired jets to produce opposite but unequal reactions between the platform and the casing, such as to torque the platform to the inertially stabilized position.

7. The device of claim 6 wherein said thrust deflector is in the form of a section of a cylinder.

8. The device of claim 6 wherein said inertial stabilization signals are electrical, said means for rotatably driving the deflector comprising an electrical torquer.

9. In an inertial platform in the form of a ball supported in a spherical casing on a liquid bearing formed between the ball and casing and having a source of pressurized fluid, means for generating electrical inertial stabilization signals, a torquer system including a plurality of torquer units for torquing said platform in response to said stabilization signals to maintain the platform inertially stabilized, each of said torquer units comprising:

a base member mounted in the surface of the platform, a thrust deflector, means for elastically supporting said deflector on said base member for limited rolling motion thereon, means for conveying a fluid jet from said source of pressurized fluid through said base member and against the surface of said deflector, said deflector splitting said fluid jet into a pair of jets which cause equal and opposite torsional reactions between the platform and the casing with the deflector in a predetermined neutral position, a pair of end fence members mounted on said deflector and spaced axially from each other along said deflector on opposite longitudinal sides of each of said fluid jets to minimize axial dispersion of the jets, an electrical torquer mounted in said base member adjacent to said deflector, at least a portion of said electrical stabilization signals being fed to said electrical torquer, and a torquer armature on said deflector positioned opposite said electrical torquer for interaction therewith, whereby said electrical torquer rotatably drives said deflector from said predetermined neutral position through a limited arc in response to the electrical inertial stabilization signals, thereby causing said paired jets to produce opposite but unequal reactions between the platform and the casing, such as to torque the platform to the inertially stabilized position.

* * * * *